(No Model.)
E. W. SMART.
FLUSHING VALVE.
No. 464,590. Patented Dec. 8, 1891.
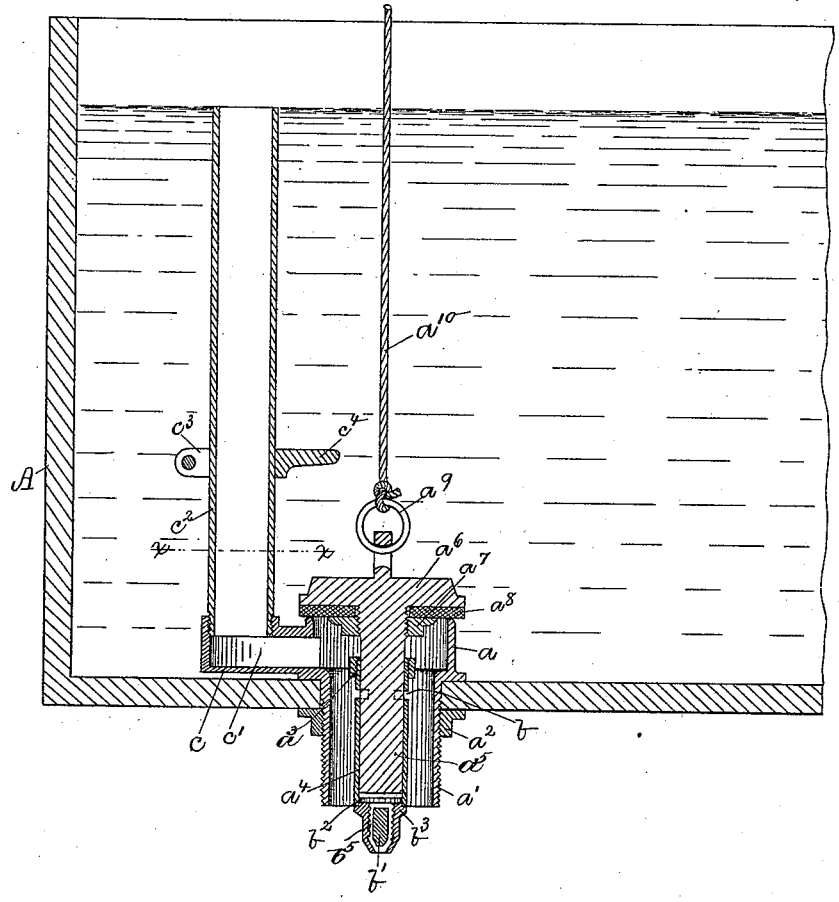
Fig. 1.
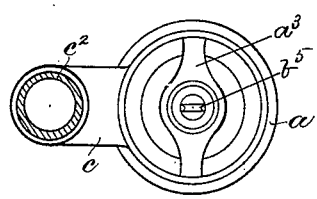
Fig. 2.
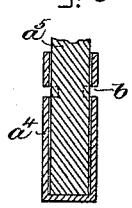
Fig. 3.
Fig. 4.
Fig. 5.
Witnesses.
Edgar B. Goddin
Frederick L. Emery
Inventor.
Elijah W. Smart,
by Crosby & Gregory
Attys.

UNITED STATES PATENT OFFICE.

ELIJAH W. SMART, OF EXETER, NEW HAMPSHIRE.

FLUSHING-VALVE.

SPECIFICATION forming part of Letters Patent No. 464,590, dated December 8, 1891.

Application filed January 11, 1890. Serial No. 336,615. (No model.)

*To all whom it may concern:*

Be it known that I, ELIJAH W. SMART, of Exeter, county of Rockingham, State of New Hampshire, have invented an Improvement in Flushing-Valves, of which the following description, in connection with the accompanying drawings, is a specification, like letters on the drawings representing like parts.

This invention relates to flushing-valves especially adapted to be used in connection with water-closets, and has for its object to provide a simple, cheap, and efficient valve.

One feature of my invention consists in constructing the valve, as will be described, whereby boring and reaming are dispensed with.

Another feature consists in providing an auxiliary valve by which the closing of the main valve may be regulated as desired to obtain a fast or slow closing valve.

My invention therefore consists, essentially, in the combination, with a tank and a valve-casing provided with a bridge and constituting an outlet for said tank, of a cylinder secured to said bridge and provided with an inlet-port in its side at or near its upper end, a valve provided with a piston closed at its bottom to enter said cylinder, and means to operate said valve, substantially as will be described.

Other features of my invention will be pointed out in the claims at the end of this specification.

Figure 1 is a section of a sufficient portion of a water-tank provided with my improved flushing-valve to enable my invention to be understood; Fig. 2, a partial section and plan view of the overflow-pipe and valve-casing, the valve being omitted, the section being taken on line $x$ $x$, Fig. 1; Figs. 3 and 4, sectional modifications to be referred to, and Fig. 5, a detail to be referred to.

The tank or vessel A, containing water or other fluid, may be of any usual or well-known construction. The tank A is provided with a water-outlet in its bottom, the said outlet consisting of a metallic shell $a$, constituting a valve-casing, and provided with a threaded extension or sleeve $a'$, extended through a suitable hole in the bottom of the tank and engaged by a threaded nut or ring $a^2$, by which the valve-casing is firmly secured in position within the tank. The valve-casing $a$ is provided with a bridge $a^3$, preferably cast integral with the said casing and having, as herein shown, a threaded opening engaged by the threaded end of a tube or pipe $a^4$, forming the cylinder of a dash-pot, in which is reciprocated a piston $a^5$, herein shown as a solid rod secured to a cap or plate $a^6$, having secured to its under side, as by a threaded ring $a^7$, a washer $a^8$, preferably of leather, the said washer constituting the valve proper, it co-operating with the annular rim of the valve-casing $a$. The valve-cap has secured to it by a ring $a^9$, or in any other usual manner, one end of the usual pull-chain $a^{10}$. The cylinder $a^4$ is preferably provided at or near its upper end with one or more slots $b$, constituting water-inlet ports, and the said cylinder may be provided at its lower end with an adjustable plug-valve $b'$, herein shown as a screw-threaded plug, provided with an annular flange $b^2$, co-operating with a valve-seat $b^3$, herein shown as an internally-threaded plug, which may be secured to the cylinder $a^4$ by solder or in other suitable manner, or it may form an integral part thereof. The plug-valve $b'$ below its annular flange $b^2$ is provided, preferably, with two diametrically-opposite slots $b^5$. (Shown best in Fig. 2.) The valve-casing $a$ is provided with an extension $c$, preferably cast integral therewith and forming a chamber $c'$, communicating with the interior of the valve-casing and with the usual discharge-pipe, (not shown,) but which in practice, is secured to the sleeve $a'$. The extension $c$ has secured to or forming part of it an overflow-pipe $c^2$, provided, as shown, with a collar $c^3$, having an arm $c^4$, forming a stop to limit the upward movement of the valve, the said collar being adjustable on the said overflow-pipe to regulate the extent of opening of the valve.

In operation the valve is raised from its seat by pulling upon the chain $a^{10}$ in usual manner, the collar $c^3$ being adjusted on the overflow-pipe so that the valve will be raised a sufficient distance to uncover the ports $b$ and permit the water flowing from the tank to fill the cylinder $a^4$. As soon as the chain is released, the valve descends by gravity, but is retarded in its descent by the water in the cylinder $a^4$, which must escape through the ports $b$ when the plug-valve is screwed down tightly upon its seat, the piston fitting the cylinder $a^4$ somewhat loosely, so as to permit the fluid to pass up between it and the cylinder. The valve will thus form what is technically known as a "slow-closing flushing-valve." If it is desired that the valve should close quicker, the plug-valve $b'$ may be raised from its seat more or less, as desired, by removing the valve-cap $a^6$ and its valve $a^8$ and unscrewing the plug-valve. With the plug-valve raised from its seat, additional outlets are afforded for the water through the passage $b^5$, and as a result the valve $a^8$ is closed quicker. I prefer to use the plug-valve $b'$; but where only a slow-closing valve is required the cylinder $a^4$ may be permanently closed at its bottom, as shown in Fig. 3.

By securing the piston to the valve-cap and fitting it within the cylinder $a^4$, I avoid boring and reaming, thereby effecting a considerable saving in the cost of construction. It will be noticed that the cylinder $a^4$ is detachable from the bridge, and as a result of this construction the said cylinder may be removed from the bridge after the valve-casing has been placed in position for purpose of repair or cleaning, and the said cylinder may be removed and repaired without removing the valve-casing from the tank.

I claim—

1. The combination, with a tank and a valve-casing provided with a bridge and constituting an outlet for said tank, of a cylinder secured to said bridge and provided with an inlet-port in its side at or near its upper end, a valve provided with a closed piston to enter said cylinder and normally close the inlet-port therein, and means to operate said valve and raise the end of the piston above the inlet-port to open it, substantially as described.

2. The combination, with a tank and a valve-casing provided with a bridge and constituting an outlet for said tank, of a cylinder detachably secured to said bridge and provided with a water-inlet port in its side, a valve provided with a closed piston to enter said cylinder and normally close the inlet-port, an adjustable outlet-valve for said cylinder, and means to operate said valve and piston to open the valve-casing and inlet-port of said cylinder, substantially as described.

In testimony whereof I have signed my name to this specification in the presence of two subscribing witnesses.

ELIJAH W. SMART.

Witnesses:
JAS. H. CHURCHILL,
EMMA J. BENNETT.